Patented May 9, 1950

2,507,316

UNITED STATES PATENT OFFICE 2,507,316

LINEAR CHLOROMETHYLMETHYL-SILOXANES

Rob Roy McGregor, Verona, and Earl Leathen Warrick, Pittsburgh, Pa., assignors to Dow Corning Corporation, Midland, Mich., a corporation of Michigan No Drawing. Application July 19, 1948, Serial No. 39,594

4 Claims. (Cl. 260—448.2)

The present invention relates to (chloromethyl)methylpolysiloxanes and to their production.

Siloxanes which have active functional groups bonded to the silicon atoms of the siloxane would be of substantial importance inasmuch as the provision of such siloxanes would make possible the preparation of a wide range of derivatives from the siloxanes in question.

Objects of the present invention are the provision of siloxanes having such active functional substituents linked to the silicon atoms by carbon to silicon bonds.

Compounds in accordance herewith correspond to the general formula $R_3SiO(SiR_2O)_xSiR_3$. In this general type of compound, $x$ has a positive value, and each R is selected from the group methyl and chloromethyl, there being both methyl and chloromethyl radicals contained in the compound but not more than one chloromethyl radical linked to any one silicon atom.

Compounds of this type may be prepared by cocondensing chloromethylmethylsiloxane units with either trimethylsiloxane units or chloromethyldimethylsiloxane units. Likewise, compounds in accordance herewith may be prepared by cocondensing dimethylsiloxane units with chloromethyldimethylsiloxane units. Operatively, the condensates may be prepared by cohydrolyzing and cocondensing dimethyldichlorosilane or chloromethylmethyldichlorosilane with trimethylchlorosilane or chloromethyldimethylchlorosilane. Alternatively, the compounds hereof may be produced by equilibration of the corresponding siloxanes.

The products hereof are useful per se as dielectric fluids. They are further of considerable utility as siloxane intermediates for the production of compounds of types which it has been impossible otherwise to prepare.

EXAMPLE 1

A solution of 178 grams of chloromethyldimethylchlorosilane in aqueous ethanol was refluxed for two hours with 46 grams of crystalline hexamethylcyclotrisiloxane. The product of hydrolysis and rearrangement was washed with water until the wash water was neutral to litmus, dried over calcium chloride and finally distilled. The properties of the products so obtained are shown in Series No. 1 in the table following Example 3.

EXAMPLE 2

A solution containing one gram mol of hexamethyldisiloxane in aqueous methanol was refluxed with one gram mol of chloromethylmethyldichlorosilane for 3.5 hours. The products were washed with water until the wash water was neutral to litmus, following which the product was dried over calcium chloride, and finally distilled. The products were obtained which are shown in Series No. 2 of the table following Example 3.

EXAMPLE 3

One mol of chloromethylmethyldichlorosilane and two mols of chloromethyldimethylchlorosilane were hydrolyzed by adding an excess of aqueous ethanol. The copolymerization product so obtained was washed with water until the wash water was neutral to litmus, dried over calcium chloride, and distilled. The properties of the product so obtained are shown in Series No. 3 of the following table:

| $x=$ | B. P., °C. | $n_D^{25°}$ | $d_4^{25°}$ | Mol. Ref. | Cs Viscosity 0° C. | Cs Viscosity 99.4° C. | E (Visc.)[1] | Dielectric constant | F. P., °C. | Sapon. Eq. |
|---|---|---|---|---|---|---|---|---|---|---|
| SERIES NO. I—$ClCH_2SiMe_2O(Me_2SiO)_xSiMe_2CH_2Cl$ |||||||||||
| | (at 40 mm.): | | | | | | | | | |
| 1 | 141.9° | 1.4283 | 1.0195 | 77.12 | 4.55 | 0.998 | 3,068 | 5.4 | −79 | 153.1 |
| 2 | 167.7° | 1.4231 | 1.0083 | 95.88 | 5.61 | 1.204 | 3,112 | 5.3 | −94 | 189.3 |
| 3 | 189.9° | 1.4200 | 1.0023 | 114.82 | 6.80 | 1.413 | 3,178 | | −85 | 223.6 |
| 4 | 222.7° | 1.4173 | 0.9963 | 133.16 | | | | 4.7 | −77 | 264.5 |
| Residue | | | | | high viscosity | | | | | |
| SERIES NO. II—$Me_3SiO(MeSiCH_2ClO)_xSiMe_3$ |||||||||||
| | (at 225 mm.): | | | | | | | | | |
| 1 | 101.6° | 1.4058 | 0.9177 | 71.54 | 2.46 | 0.697 | 2,221 | 3.9 | −85 | 269.8 |
| 2 | 162.0° | 1.4212 | 1.0058 | 95.50 | 6.02 | 1.185 | 3,286 | 5.1 | −77 | 189.5 |
| 3 | 210° | 1.4311 | 1.0625 | 118.9 | 9.85 | 1.673 | 3,584 | 5.4 | −85 | 164.2 |
| 4 | 250.6° | 1.4375 | 1.1001 | 142.2 | 21.17 | 2.680 | 4,198 | 5.8 | −77 | 152.6 |
| Residue | | | | | high viscosity | | | | | |
| SERIES NO. III—$ClCH_2Me_2SiO(MeSiCH_2ClO)_xSiMe_2CH_2Cl$ |||||||||||
| | | | | | | | | | | Mol. Weight |
| 1 | (at 40 mm.): 175.5° | 1.4465 | 1.1115 | 81.83 | (55.8° C.) 2.747 | 1.443 | 3,586 | 7.3 | | 341 |
| 2 | (at 5 mm.): 167° | 1.4520 | 1.1574 | 104.44 | 4.969 | 2.446 | 3,958 | 7.1 | | 440 |
| 3 | 210° | 1.4553 | 1.1819 | 128.17 | 7.999 | 3.613 | 4,429 | 6.8 | | 560 |
| Residue | | | | | high viscosity | | | | | |

[1] $E$(Visc.) = Energy of activation of flow in calories as determined by the equation $E(\text{Visc.}) = 2.3\, R \log\left(\dfrac{n_2 - n_1}{T_2 - T_1}\right) T_2 T_1$ where $n_1$ is the viscosity at temperature $T_1$, $n_2$ is the viscosity at temperature $T_2$ and $R$ is the gas constant in calories per degree.

That which is claimed is:

1. Compounds in accordance with the general formula $R(CH_3)_2SiO[SiR'CH_3O]_xSi(CH_3)_2R$ in which $x$ has a positive value, R is selected from the group consisting of methyl and chloromethyl radicals in which compounds both R's are alike in any one molecule and R' is selected from the group consisting of methyl and chloromethyl radicals, there being at least one chloromethyl radical in each molecule.

2. $ClCH_2(CH_3)_2SiO[Si(CH_3)_2O]_xSi(CH_3)_2CH_2Cl$ in which $x$ has a positive value.

3. $(CH_3)_3SiO(SiCH_3CH_2ClO)_xSi(CH_3)_3$ in which $x$ has a positive value.

4. $ClCH_2(CH_3)_2SiO(SiCH_3CH_2ClO)_xSi(CH_3)_2CH_2Cl$ in which $x$ has a positive value.

ROB ROY McGREGOR.
EARL LEATHEN WARRICK.

REFERENCES CITED

The following references are of record in the file of this patent:

UNITED STATES PATENTS

| Number | Name | Date |
|---|---|---|
| 2,384,384 | McGregor (2) | Sept. 4, 1945 |
| 2,435,148 | McGregor (1) | Jan. 27, 1948 |
| 2,439,669 | Nordlander | Apr. 13, 1948 |